US010242080B1

United States Patent
Cohen et al.

(10) Patent No.: US 10,242,080 B1
(45) Date of Patent: Mar. 26, 2019

(54) CLUSTERING APPLICATIONS USING VISUAL METADATA

(71) Applicant: GOOGLE INC., Mountain View, CA (US)

(72) Inventors: Gabriel Cohen, Alameda, CA (US); Hrishikesh Aradhye, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 14/084,816

(22) Filed: Nov. 20, 2013

(51) Int. Cl.
*G06F 17/30* (2006.01)
(52) U.S. Cl.
CPC .............................. *G06F 17/30572* (2013.01)
(58) Field of Classification Search
None
See application file for complete search history.

(56) References Cited

U.S. PATENT DOCUMENTS

| | | | |
|---|---|---|---|
| 7,185,001 B1 | 2/2007 | Burdick et al. | |
| 8,200,025 B2 | 6/2012 | Woodbeck | |
| 8,521,679 B2 | 8/2013 | Churchill et al. | |
| 8,682,819 B2 | 3/2014 | Consul et al. | |
| 8,787,683 B1 | 7/2014 | Yee et al. | |
| 9,639,694 B2* | 5/2017 | Padidar | G06F 17/30598 |
| 2002/0042793 A1* | 4/2002 | Choi | G06F 17/30687 |
| 2003/0217052 A1 | 11/2003 | Rubenczyk et al. | |
| 2005/0268338 A1 | 12/2005 | Made | |
| 2006/0056707 A1* | 3/2006 | Suomela | G06K 7/10712 |
| | | | 382/232 |
| 2007/0112754 A1 | 5/2007 | Haigh et al. | |
| 2007/0226324 A1 | 9/2007 | Branda et al. | |
| 2007/0297641 A1* | 12/2007 | Criddle | G06K 9/00375 |
| | | | 382/100 |
| 2008/0033922 A1 | 2/2008 | Cisler et al. | |
| 2008/0086775 A1 | 4/2008 | Repasi et al. | |
| 2008/0201466 A1 | 8/2008 | Adelman et al. | |
| 2009/0279794 A1* | 11/2009 | Brucher | G06F 17/30241 |
| | | | 382/225 |
| 2010/0138775 A1 | 6/2010 | Kohen et al. | |
| 2010/0205274 A1 | 8/2010 | Gharabally et al. | |
| 2010/0218091 A1 | 8/2010 | Lee | |
| 2011/0041078 A1 | 2/2011 | Park et al. | |

(Continued)

FOREIGN PATENT DOCUMENTS

| | | |
|---|---|---|
| EP | 2224336 A1 | 9/2010 |
| KR | 10-2010-0095777 | 9/2010 |

(Continued)

OTHER PUBLICATIONS

Collin McMillan et al.; "Categorizing Software Applications for Maintenance", in Proc. of 27th IEEE International Conference on Software Maintenance (ICSM '11), Williamsburg, VA, Sep. 25-30, 2011.

(Continued)

*Primary Examiner* — Tyler J Torgrimson
(74) *Attorney, Agent, or Firm* — Shumaker & Sieffert, P.A.

(57) ABSTRACT

The present disclosure provides a system and method for automatic clustering and recognition of software applications using metadata. The system selects and extracts visual features from software applications which are then classified, analyzed using a cluster analysis, and then used to assign the software application to a cluster group.

12 Claims, 5 Drawing Sheets

(56) References Cited

U.S. PATENT DOCUMENTS

| | | | |
|---|---|---|---|
| 2011/0082868 A1* | 4/2011 | Musuluri | G06F 17/30864 |
| | | | 707/749 |
| 2011/0123120 A1* | 5/2011 | Quack | G06F 17/30256 |
| | | | 382/197 |
| 2011/0208801 A1 | 8/2011 | Thorkelsson et al. | |
| 2011/0313843 A1 | 12/2011 | Rounthwaite et al. | |
| 2012/0095979 A1 | 4/2012 | Aftab et al. | |
| 2012/0233163 A1* | 9/2012 | Kirkpatrick | G06F 8/77 |
| | | | 707/737 |
| 2012/0233165 A1 | 9/2012 | Kirkpatrick | |
| 2012/0260232 A1 | 10/2012 | Hirsch et al. | |
| 2012/0290583 A1* | 11/2012 | Mahaniok | G06F 8/60 |
| | | | 707/741 |
| 2013/0014040 A1 | 1/2013 | Jagannathan et al. | |
| 2013/0014146 A1 | 1/2013 | Bhatia et al. | |
| 2013/0055211 A1* | 2/2013 | Fosback | G06Q 10/10 |
| | | | 717/126 |
| 2013/0124449 A1 | 5/2013 | Pinckney et al. | |
| 2013/0275431 A1* | 10/2013 | Rathod | G06F 17/30256 |
| | | | 707/737 |
| 2014/0280131 A1 | 9/2014 | Martens et al. | |
| 2015/0055854 A1* | 2/2015 | Marchesotti | G06K 9/627 |
| | | | 382/159 |
| 2015/0200815 A1* | 7/2015 | Verkasalo | G06F 17/30867 |
| | | | 707/740 |

FOREIGN PATENT DOCUMENTS

| | | |
|---|---|---|
| KR | 10-2013-0082848 | 7/2013 |
| KR | 10-2014-0018329 | 2/2014 |
| KR | 10-2014-0045549 | 4/2014 |

OTHER PUBLICATIONS

"Amazon.com: What are Statistically Improbable Phrases?" Accessed from http://www.amazon.com/gp/search-inside/sipshelp.html on Mar. 8. 2011, 1 pp.

Almohammad et al.: Face and Gait Fusion Methods: A Survey, International Journal of Computer Science and Telecommunications, vol. 4, Issue 4, Apr. 2013, pp. 19-28.

Wikipedia, the free encyclopedia, "Statistically Improbable Phrases, from Wikipedia, the free encyclopedia," Last modified on Jan. 26, 2011 Retrieved from http://en.wikipedia.org/wiki/Statistically_Improbable_Phrases 2 pp.

Prosecution History from U.S. Appl. No. 13/043,214, dated Jan. 19, 2012 through Apr. 7, 2017, 184 pp.

Prosecution History from U.S. Appl. No. 13/250,592, dated Dec. 2, 2011 through Feb. 22, 2017 206 pp.

Gallestey, "Cluster Analysis," Encyclopaedia Britannica, last modified Nov. 23, 2017, accessed from https://www.britannica.com/topic/cluster-analysis on Mar. 15, 2017, 3 pp.

* cited by examiner

CLUSTERING APPLICATIONS USING VISUAL METADATA

FIELD

The present disclosure a dynamical system and method for identifying visual metadata from screenshots of a software application, analyzing the identified visual metadata, and categorizing the software application based on the analysis. The software application is then presented to a user on a display in a cluster of other similar software applications.

BACKGROUND

With recent developments in mobile technology, numerous software developers are concentrating on producing software applications (typically "apps") that perform various functions. Because of the increase in the number and variety of such software applications, finding a desired application can be challenging, especially where the categorization of a software application is inaccurate or imprecise. Thus, there is a need for an improved system and method for recognition of applications and for presenting them to a user in a coherent fashion, for example by clustering them.

SUMMARY

The present disclosure provides a system and method for recognition of applications visual metadata and a clustering of the applications based on the recognized visual metadata.

It is a feature of the disclosed subject matter to recognize visual metadata by inputting screenshot images of an application to a machine learning system to extract visual features from those images to build clusters.

It is further a feature of the disclosed subject matter to perform both feature extraction and clustering, wherein clustering includes grouping software applications based on a commonly identified visual metadata. Accordingly, software applications are classified in a more desirable fashion.

It is a still further feature of the disclosed subject matter to provide a method for clustering applications based on visual metadata by identifying metadata as at least one visual feature of an application; assigning a classification to each application based on the at least one identified visual feature; performing a cluster analysis based on the assigned classification; and selecting a cluster assignment to the application based on the cluster analysis.

BRIEF DESCRIPTION OF THE DRAWINGS

The above-described and other advantages and features of the present disclosure will be appreciated and understood by those skilled in the art from the following detailed description and drawings.

DETAILED DESCRIPTION OF EXAMPLES

Figure 3:
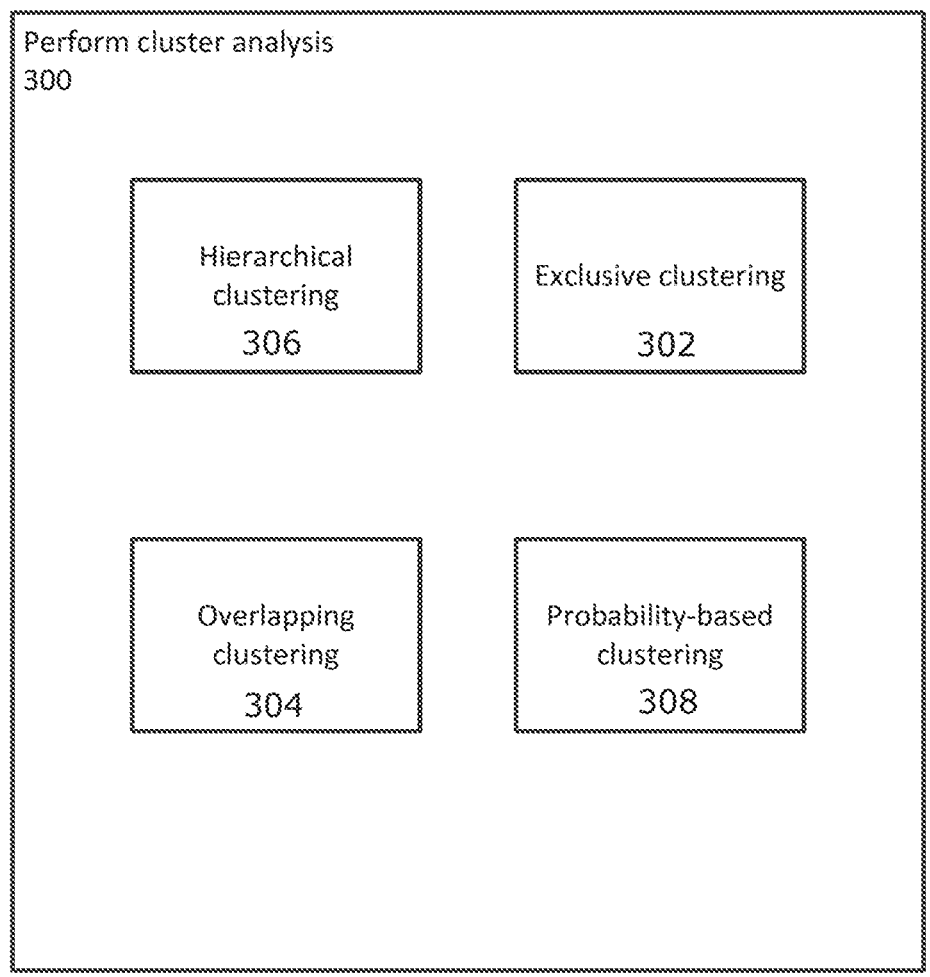
FIG. 3 illustrates elements used for the clustering analysis step in the flow chart of FIG. 1.
Figure 4:
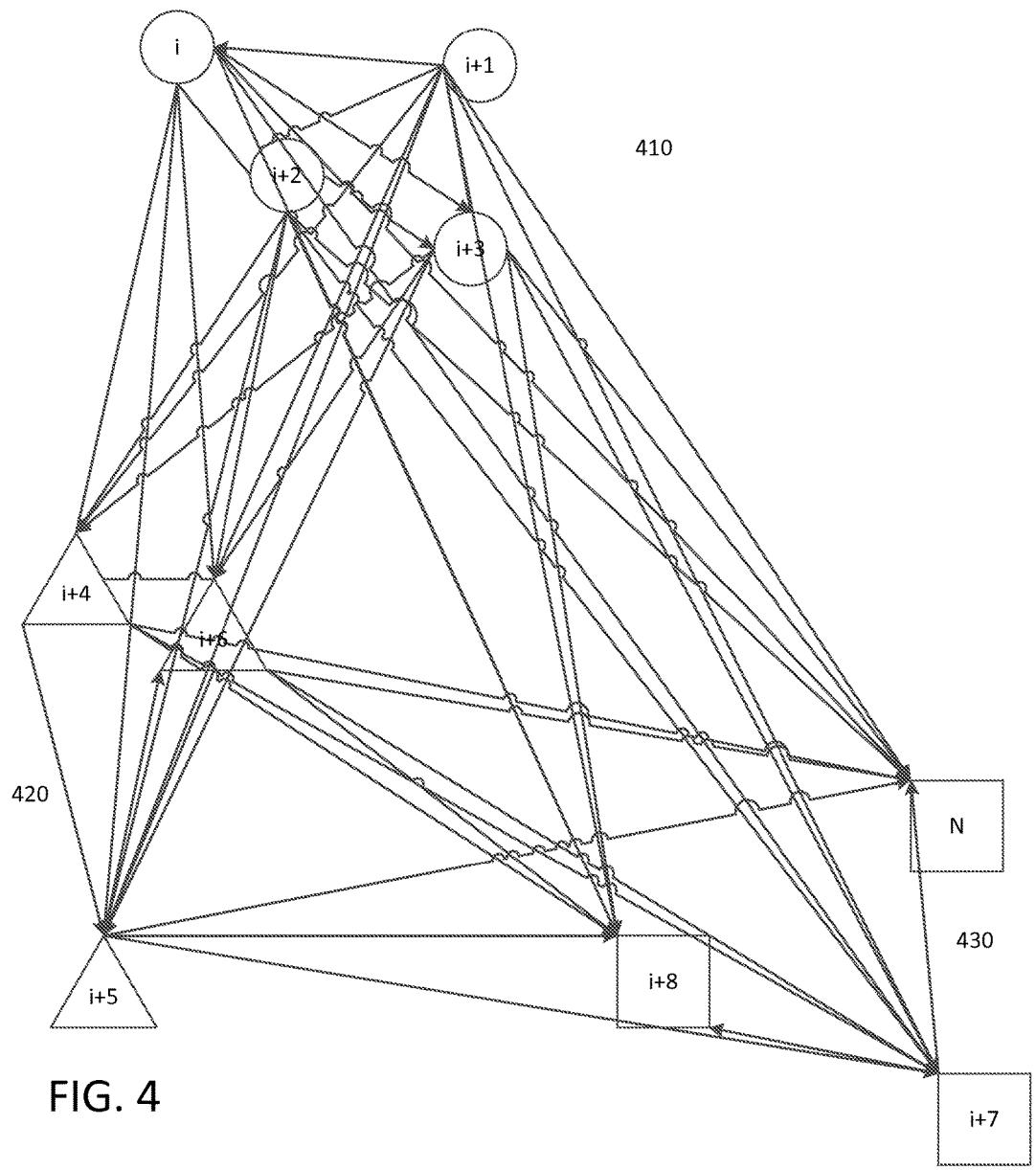
FIG. 4 is a graphic illustration of how different software applications may be clustered together.
Figure 5:
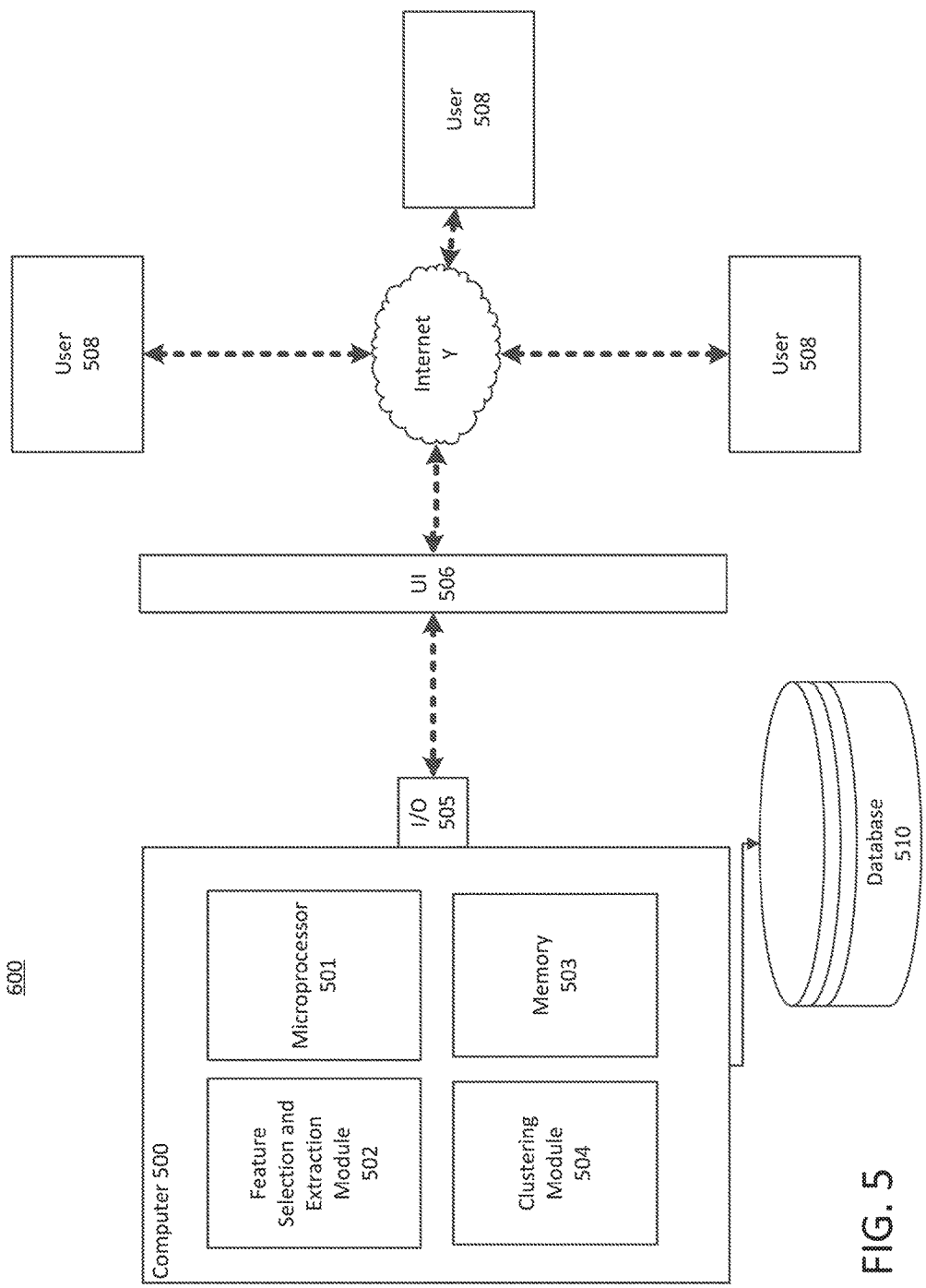
FIG. 5 is a block diagram of a system for automatic recognition and clustering applications.

FIGS. 1 through 5 illustrate a system and method for automatic clustering of applications using metadata. As shown in FIG. 5, the system 600 preferably includes a computer (or computers) 500 including a microprocessor 501, a feature selection and extraction module 502 and a clustering module 504 and memory 503. The system further includes a user interface (UI) 506 that connects with the computer 500 via I/O 505 to allow a user 508 connected via the internet Y to interact with the computer 500. A data warehouse comprising a database 510 is also connected to the computer 500. It should be understood that the various modules, such as modules 502 and 504 that may be implemented by software are represented in FIG. 5 as discrete components for the sake of clarity A user 508 may access the UI 506 using a variety of devices, including but not limited to a mobile phone, a tablet, a personal computer (PC), or other computing device. By connecting to the Internet Y, a user 508 is able to interact with the computer 500.

Figure 1:
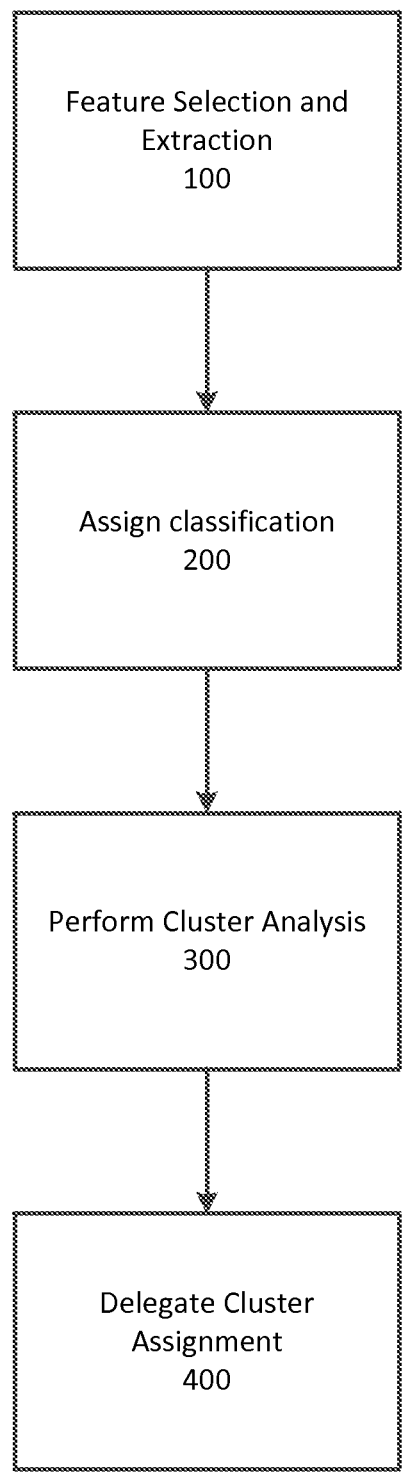
FIG. 1 is a flow chart illustrating the method of automatic clustering and recognition of applications using metadata.
Figure 2:
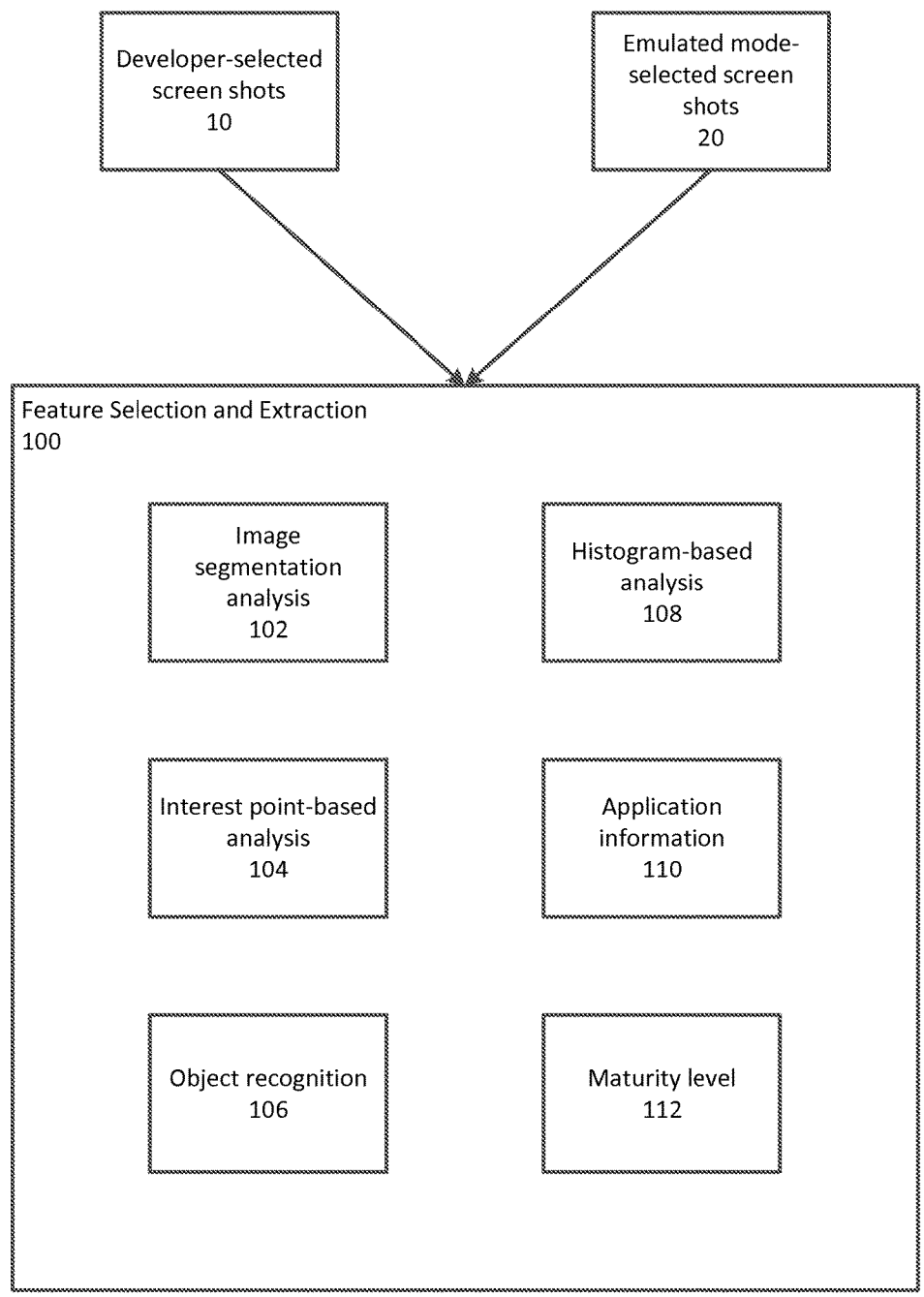
FIG. 2 illustrates various modules used for the feature selection and extraction steps in the flow chart of FIG. 1.

The feature selection and extraction module 502 performs several functions, illustrated in FIGS. 1 and 2. First, it selects and extracts features from software applications (step 100). Once features are extracted, the features are assigned a classification (step 200), whereby the classification may be numerical, a set of characters, or some combination of the two. A cluster analysis is then performed on the classifications (step 300). A variety of methods for cluster analysis may be used and will be discussed in further detail. As a result of the cluster analysis 300, at least one cluster assignment is delegated to each software application (step 400). Each cluster designation places the software application in a category with other software applications that have similar extracted features.

As illustrated in FIG. 2, prior to features selection and extraction 100, a feed of information may be required in order to perform the feature selection and extraction. This information may be obtained through screen shots provided by the software developer 10 when the developer submits his or her software application to a digital multimedia content service provider. Alternatively, the digital multimedia content service provider may run the software application in an emulated mode to obtain screen shots 20. Once the screen shots are obtained, they are stored in the database 510. The screen shots are then processed during feature selection and extraction step 100 (via the feature extraction and selection module 502).

In feature selection and extraction step 100 a variety of methods and techniques to select and extract features may be used using specific modules, such as image segmentation analysis 102, interest point-based analysis 104, object recognition 106, histogram-based analysis 108, application information analysis 110, and maturity level analysis 112.

In image segmentation analysis 102, images (screen shots) are segmented so that each segment may be parsed and examined for pixel color, pattern recognition, and other elements. Segmentation analysis 102 may be used to locate objects and boundaries in the screen shots.

In interest point-based analysis 104, the feature selection and extraction step 100 determines points in an image that are rich in information content. These points may be determined using techniques such as blob detection, edge detection, corner detection, and ridge detection. Interest point-based analysis 104 may be used to determine the presence of certain objects within the image. Furthermore, an interest point-based analysis may be utilized to understand the texture of the image.

Object recognition 106 may be used in conjunction with data from a database 510 which contains information on objects that may repeat in screen shots of similar applications. For example, video player software applications tend to have a control panel with a play button and a status bar. This information may be stored as image object data in a database 510 and during object recognition 106, the video player object information may be compared to screen shots of software applications in order to detect specific software applications. The object recognition module 106 may be designed to recognize software applications that contain a play button and a status bar. These applications may then be assigned a category reference indicating that they contain media player objects. In another example, object recognition 106 may recognize gaming applications with similar character graphics or scenery graphics. Thus, object recognition 106 may recognize gaming applications all having images of farms, animals, etc. that may be categorized as certain type roll playing games.

Thus, key features are extracted from software application screen shots. These key features are then compared with entries in a database 501 and information about what objects may have created these features are retrieved. Position, orientation, and scale may also be accounted for in object recognition by using a variety of features stored in the database 501.

Histogram-based analysis 108 includes the analysis of pixels of digital images. Preferably, an image is partitioned and each partition is analyzed with respect to pixel color information. A color histogram is then produced to represent the distribution of colors within the image or partition by providing the number of pixels that have colors in each of a fixed color range. The set of fixed color ranges span the image's color space. This analysis may provide object information, such as scenery information and the like, so that software applications with similar color histograms and patterns may be grouped together.

Application information analysis 110 receives all developer-produced data including, but not limited to, software application title and description, developer-created metadata associated with the software application, a maturity rating pre-associated with the software application, developer data, and all text-based data associated with the application provided by the developer or from other sources.

In an alternative embodiment, where a software application does not contain maturity level information, the feature selection and extraction step 100 may utilize any of the tools to detect and tag mature content to assign a maturity rating to the software application. For example, where applications contain violent content, such as weapons and the like, image segmentation analysis 102, interest point-based analysis, object recognition 106, or histogram-based analysis 108 may pick up those graphics and mark the software application as containing mature content.

As previously mentioned, once the software application features are selected and extracted in step 100, the selected and extracted features are assigned a classification in step 200. This classification may be a numerical classification, or text-based classification, or some combination of the two. A cluster analysis step 300 is then performed on the classified features to determine patterns in the features and group the features by resemblance and the software applications are then arranged into different cluster, each cluster having some predetermined feature that is common to all the software applications within the cluster.

FIGS. 3 and 4 illustrate some illustrative clustering criteria. Generally, clustering occurs where there are a set of data items, $X \in R^{m \times n}$ representing a set of m points $x_i$ in $R^n$, a Euclidean n dimensional space. Clustering aims to accomplish the objective of partitioning X into K groups $C_k$ such that a data item belonging to a group is more similar to other data items in that group than data items in other groups. Each of the K groups is called a cluster.

By way of example, FIG. 4 illustrates three cluster groups, 410, 420, and 430. Each data item, denoted i through N is compared against all other data items, such that a "distance" between data items is computed. Data items similarly "distanced" from one another are grouped together in a cluster.

Various types of clustering criteria are shown in FIG. 3. In one embodiment, the cluster groups may be exclusive such that every data item belongs in only one group (exclusive clustering 302). In an alternative embodiment, the cluster groups may be overlapping, meaning that at least one software application may belong to several cluster groups (overlapping clustering 304). In yet another embodiment, the cluster groups can be hierarchical, whereby each data item is assigned its own cluster and then clusters are merged as similarities are computed until all clusters are contained in one cluster called the root node (hierarchical clustering 306). In another embodiment, the cluster groups may be probabilistic and each data item is assigned to a cluster group depending on an assigned probability (probability based clustering 308).

In general, these cluster analyses seek either to minimize a cost function (or optimize a certain measurement which associates a cost to each data item and cluster assignment) or to perform a number of iterations, analyzing the data items and/or clusters in each iteration to differentiate data items based on dissimilarities between the data items and/or clusters.

In a simple implementation, a common visual feature will be selected and extracted, such as video playback controls. A machine learning system may be used to extract and correlate the presence of these shapes as features which represent a cluster. The system can then look for other metadata, such as listing details or feedback, and find that video is a strongly correlated with these visual features.

Thereafter these clusters can be used as new navigational categories, or as a source of related software applications when viewing one software application within a cluster. Alternatively, these clusters can be used as seeds to populate metadata when a publisher is listing a software application in a digital multimedia content service.

In an alternative embodiment, visual features that are extracted may be used to distinguish quality of the software application which can be correlated with ratings of the software application (user ratings, digital multimedia content service ratings, maturity level ratings, etc.) in order to predict likely quality of the software application or influence a ranking for new software applications which have not received any user or digital multimedia content service feedback.

Once a cluster assignment is generated, the assignment may be automatically linked to the software application. Alternatively, the cluster assignment may be sent to the software developer for verification that the software application is properly classified. The software developer may then affirm classification or may request that another assignment be generated.

The accompanying drawings illustrate a system and method for recognition of applications visual metadata and a clustering of the applications based on the recognized visual metadata, its constituent parts, and method of use. However, other types and styles are possible, and the drawings are not intended to be limiting in that regard. For example logos, images or videos may be included along with metadata. Thus, although the description above and accompanying drawings contains much specificity, the details provided should not be construed as limiting the scope of the embodiment(s) but merely as providing illustrations of some of the presently preferred embodiment(s). The drawings and the description are not to be taken as restrictive on the scope of the embodiment(s) and are understood as broad and general teachings in accordance with the present invention. While the present embodiment(s) of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

We claim:

1. A method, comprising:
executing, by a computing system, an application in an emulation mode;
obtaining, by the computing system and while executing the application in the emulation mode, a plurality of screen shots;
extracting, by the computing system, at least one visual feature from one or more screen shots from the plurality of screen shots using a machine learning system;
assigning, by the computing system and based on the at least one visual feature and one or more other visual features extracted from screen shots of other applications, the application to an application cluster, wherein each application included in the application cluster is more similar to each other than to applications included in other application clusters;
determining, by the computing system and based on the at least one visual feature, whether any of the plurality of screen shots includes violent content;
responsive to determining that at least one of the plurality of screen shots includes violent content, determining, by the computing system and based on respective maturity level ratings of other applications included in the application cluster, a maturity level rating for the application; and
presenting, by the computing system and for display, information about the application and information about at least one other application included in the application cluster, the information including at least the maturity level rating.

2. The method of claim 1, wherein extracting at least one visual feature from the one or more screen shots comprises applying one or more of: image segmentation analysis, interest point-based analysis, object recognition algorithms, or histogram-based analysis to the one or more screen shots.

3. The method of claim 1, wherein assigning the application to the application cluster comprises:
assigning the application to a unique application cluster that only includes the application, wherein the unique application cluster is included in a plurality of unique application clusters; and
merging, based on one or more similarities between each of the plurality of unique application clusters, each of the plurality of unique application clusters into a hierarchical tree to form the application cluster.

4. The method of claim 1, wherein the application is included in more than one application cluster of a plurality of application clusters.

5. The method of claim 1, wherein the application is included in only one application cluster from a plurality of application clusters.

6. The method of claim 1, further comprising:
analyzing a respective set of visual features, a respective classification, and a respective cluster assignment for each of a plurality of software applications; and
storing associations between the software applications, the respective sets of visual features and the respective cluster assignments in a database.

7. A system comprising:
a microprocessor; and
a memory that stores a database, the database storing visual metadata including visual features associated with said software application,
wherein the microprocessor is configured to:
execute an application in an emulation mode;
obtain, while executing the application in the emulation mode, a plurality of screen shots;
extract at least one visual feature from one or more screen shots from the plurality of screen shots using a machine learning system;
assign, based on the at least one visual feature and one or more other visual features extracted from screen shots of other applications, the application to an application cluster, wherein each application included in the application cluster is more similar to each other than to applications included in other application clusters;
determine, based on the at least one visual features, whether any of the plurality of screen shots includes violent content;
responsive to determining that at least one of the plurality of screen shots includes violent content, determine, based on respective maturity level ratings of other applications included in the application cluster, a maturity level rating for the application; and
present, for display, information about the software application and information about the at least one other application included in the application cluster, the information including at least the maturity level rating.

8. The system of claim 7, wherein the microprocessor is configured to:
extract the at least one visual feature from the one or more screen shots by applying one or more of: image segmentation analysis, interest point-based analysis, object recognition, or histogram-based analysis to the one or more screen shots.

9. The system of claim 7, wherein the microprocessor is configured to:
assign the application to a unique application cluster that only includes the application, wherein the unique application cluster is included in a plurality of unique application clusters; and
merge, based on one or more similarities between each of the plurality of unique application clusters, each of the plurality of unique application clusters into a hierarchical tree to form the application cluster.

10. The system of claim 7, wherein the application is included in more than one application cluster of a plurality of application clusters.

11. The system of claim 7, wherein the application is included in only one application cluster from a plurality of application clusters.

12. The system of claim 7, wherein the microprocessor is further configured to:

analyze a respective set of visual features, a respective classification, and a respective cluster assignment for each of a plurality of software applications; and store associations between the software applications, the respective sets of visual features and the respective cluster assignments in the database.

\* \* \* \* \*